(12) United States Patent
Gurreri

(10) Patent No.: US 7,695,197 B2
(45) Date of Patent: Apr. 13, 2010

(54) BEND LIMITER

(75) Inventor: Michael Lawrence Gurreri, York, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/787,947

(22) Filed: Apr. 18, 2007

(65) Prior Publication Data

US 2008/0175555 A1 Jul. 24, 2008

(51) Int. Cl.
*G02B 6/38* (2006.01)
(52) U.S. Cl. .......................................... 385/69; 385/86
(58) Field of Classification Search ................. 385/85, 385/86, 100
See application file for complete search history.

(56) References Cited

U.S. PATENT DOCUMENTS

| | | | | |
|---|---|---|---|---|
| 2,973,501 A * | 2/1961 | Mapelsden et al. | ........... | 439/456 |
| 3,051,774 A * | 8/1962 | Schelke | ........ | 174/135 |
| 3,786,397 A * | 1/1974 | Bridges | ............ | 439/277 |
| 4,408,089 A * | 10/1983 | Nixon | ............ | 174/34 |
| 4,461,529 A * | 7/1984 | Fariss | ............ | 439/604 |
| 4,506,946 A * | 3/1985 | Hodge | ............ | 385/70 |
| 4,541,685 A * | 9/1985 | Anderson | ............ | 385/72 |
| 4,608,739 A * | 9/1986 | Miller | ............ | 29/421.1 |
| 4,718,860 A * | 1/1988 | Gobets et al. | ............ | 439/447 |
| 4,731,502 A * | 3/1988 | Finamore | ............ | 174/74 R |
| 5,000,536 A * | 3/1991 | Anderson et al. | ............ | 385/69 |
| 5,037,175 A * | 8/1991 | Weber | ............ | 385/76 |
| 5,073,044 A * | 12/1991 | Egner et al. | ............ | 385/86 |
| 5,094,552 A * | 3/1992 | Monroe et al. | ............ | 385/76 |
| 5,138,678 A * | 8/1992 | Briggs et al. | ............ | 385/86 |
| 5,151,962 A * | 9/1992 | Walker et al. | ............ | 385/86 |
| 5,252,064 A * | 10/1993 | Baum et al. | ............ | 433/80 |
| 5,329,603 A * | 7/1994 | Watanabe et al. | ............ | 385/86 |
| 5,347,603 A * | 9/1994 | Belenkiy et al. | ............ | 385/86 |
| 5,390,272 A * | 2/1995 | Repta et al. | ............ | 385/100 |
| 5,461,690 A * | 10/1995 | Lampert | ............ | 385/100 |
| 5,473,723 A * | 12/1995 | Stockman et al. | ............ | 385/134 |
| 5,528,712 A * | 6/1996 | Belenkiy et al. | ............ | 385/78 |
| 5,571,145 A * | 11/1996 | Drebin | ............ | 607/37 |
| 5,640,476 A * | 6/1997 | Womack et al. | ............ | 385/86 |
| 5,739,472 A * | 4/1998 | Buck et al. | ............ | 174/107 |
| 5,781,681 A * | 7/1998 | Manning | ............ | 385/86 |
| 5,809,403 A * | 9/1998 | MacDonald et al. | ...... | 455/575.7 |
| 5,833,495 A * | 11/1998 | Ito | ............ | 439/610 |
| 5,915,056 A * | 6/1999 | Bradley et al. | ............ | 385/76 |
| 5,933,557 A * | 8/1999 | Ott | ............ | 385/86 |
| 6,019,521 A * | 2/2000 | Manning et al. | ............ | 385/77 |
| 6,039,081 A * | 3/2000 | Albert | ............ | 138/120 |
| 6,134,370 A * | 10/2000 | Childers et al. | ............ | 385/135 |
| 6,196,733 B1 * | 3/2001 | Wild | ............ | 385/86 |
| 6,224,423 B1 * | 5/2001 | Yip et al. | ............ | 439/608 |
| 6,357,934 B1 * | 3/2002 | Driscoll et al. | ............ | 385/86 |
| 6,374,022 B1 * | 4/2002 | Parmigiani et al. | ............ | 385/100 |

(Continued)

*Primary Examiner*—Frank G Font
*Assistant Examiner*—Peter Radkowski

(57) ABSTRACT

A bend limiter for use with electrical and fiber optic cables that can handle a relatively wide range of side loading without excessive bending is disclosed. The bend limiter is configured to bend at radii which are less than the critical curvature of the cable over a range of loads. The bend limiter includes a flexible member having two portions. One portion has a non-linear profile and is designed to absorb high loads to control bending. The other portion has a tapered linear profile and is designed to bend under light loads so that a conductor at the tip of the bend limiter does not kink.

16 Claims, 3 Drawing Sheets

U.S. PATENT DOCUMENTS

| | | | |
|---|---|---|---|
| 6,389,642 B1 * | 5/2002 | Coombs | 16/2.5 |
| 6,409,392 B1 * | 6/2002 | Lampert et al. | 385/56 |
| 6,482,017 B1 * | 11/2002 | Van Doorn | 439/89 |
| 6,554,489 B2 * | 4/2003 | Kent et al. | 385/86 |
| 6,601,997 B2 * | 8/2003 | Ngo | 385/86 |
| 6,629,783 B2 * | 10/2003 | Ngo | 385/86 |
| 6,634,801 B1 * | 10/2003 | Waldron et al. | 385/86 |
| 6,672,774 B2 * | 1/2004 | Theuerkorn et al. | 385/86 |
| 6,805,826 B2 * | 10/2004 | Coombs | 264/272.15 |
| 6,817,780 B2 * | 11/2004 | Ngo | 385/86 |
| 6,854,327 B2 * | 2/2005 | Rambow et al. | 73/250 |
| 6,932,515 B2 * | 8/2005 | Ngo | 385/86 |
| 6,959,139 B2 * | 10/2005 | Erwin et al. | 385/134 |
| 7,001,081 B2 * | 2/2006 | Cox et al. | 385/86 |
| 7,025,509 B2 * | 4/2006 | Martin | 385/86 |
| 7,029,182 B2 * | 4/2006 | Ngo | 385/53 |
| 7,064,276 B2 * | 6/2006 | Sakabe et al. | 174/110 R |
| 7,361,838 B2 * | 4/2008 | Kuo | 174/74 R |
| 2001/0049519 A1 * | 12/2001 | Holman et al. | 604/534 |
| 2002/0012504 A1 * | 1/2002 | Gillham et al. | 385/86 |
| 2002/0028604 A1 * | 3/2002 | Lo et al. | 439/607 |
| 2002/0106162 A1 * | 8/2002 | Loder et al. | 385/53 |
| 2002/0141723 A1 * | 10/2002 | Kent et al. | 385/136 |
| 2003/0068139 A1 * | 4/2003 | Theuerkorn et al. | 385/86 |
| 2003/0220628 A1 * | 11/2003 | Klisch et al. | 604/524 |
| 2004/0218888 A1 * | 11/2004 | Daoud et al. | 385/136 |
| 2004/0230291 A1 * | 11/2004 | Richter | 623/1.15 |
| 2004/0234209 A1 * | 11/2004 | Cox et al. | 385/86 |
| 2005/0265668 A1 * | 12/2005 | Martin | 385/86 |
| 2005/0273085 A1 * | 12/2005 | Hinman et al. | 606/1 |
| 2006/0272892 A1 * | 12/2006 | Poldmaa | 182/36 |
| 2007/0099485 A1 * | 5/2007 | Kuo | 439/497 |

* cited by examiner

BEND LIMITER

FIELD OF INVENTION

The present invention relates generally to a bend limiter for electrical and fiber optic cables and more specifically to a bend limiter for a connector that controls the bend radius of an attached cable in response to a side load.

BACKGROUND OF INVENTION

Ubiquitous in telecommunications are conductors used for transmitting signals. Many high bandwidth conductors, such as optical fiber and Category V copper cables, tend to have a minimum bend radius below which transmission efficiency is significantly diminished. In other words, if these conductors are bent at a radius smaller than the minimum, the signal transmission losses will be prohibitively high.

The minimum bend radius is a function of the conductor type, its thickness, and the frequency of the signal being transmitted. For example, referring to FIG. 4, transmission performance in an optical fiber is shown as a function of bend radius. The plot shows the transmission loss of a 1550 nm optical signal along a Corning 900 μm SMF-28 fiber for different bend radii. From this plot it can be seen that the transmission losses become exponential as the radius becomes smaller. The point at which the loss is considered a maximum is the minimum bend radius. As used herein, the term "minimum bend radius" refers to the point at which the attenuation is reduced to 0.3 dB according to Telcordia, although we often use a lower loss as a safety factor. In the example of FIG. 4, this corresponds to about 10.5 nm (for 0.3 dB loss).

Although it is preferable to minimize bending to improve transmission efficiency in these conductors, there is a countervailing desire to make them as flexible as possible for easy installation. Consequently, conductors are typically made so flexible that they are capable of bending beyond their minimum bend radius. Therefore, there is a need to prevent a conductor from bending past its minimum bend radius even though it may be physically capable of doing so.

The need to control bending in high bandwidth conductors is heightened by their application conditions. That is, in a typical application, these conductors are terminated to connectors which plug into a backplane or other panel such that the connector is generally perpendicular to the panel. The conductor extends from the rear of these connectors and usual makes a right angle turn where it is grouped with other conductors and distributed accordingly. Since the conductor makes a right angle turn, any tension on the conductor will cause the radius of this turn to tighten. Therefore, there is a need to limit the bending of the conductor at this point.

Prior art attempts at limiting this bending involve bend limiters which are secured to the rear end of the connector and control the bending of the conductor as it leaves the connector. For example, one prior art bend limiter comprises a tubular length of elastomeric or other polymeric material which has staggered openings in the tubular length. As the bend limiter is bent and two edges of the staggered openings meet, movement is restricted with respect to that opening and further bending of the limiter must be accommodated by another opening. Openings are staggered to provide flexure at any angle in the plane transverse to the connector termination axis. Further improvements to the bend limiter include the use of a bump at the middle of the openings to limit flexure and to provide additional compliance at a higher force in a single segment to more evenly distribute compressive forces along the length of the bend limiter.

More recently, an elastic variable diameter boot has been developed as disclosed in U.S. Pat. No. 5,781,681. The profile of this bend limiter embodies the ideal elasticity model and provides for a constant bending radius for a given side load. This bend limiter represents a substantial improvement over prior art configurations.

Although this bend limiter is a marked improvement over conventional designs, the issuance of Telcordia specification GR-326, Issue III now requires that the bend limiter maintain a minimum bend radius over a range of loads. Specifically, according to the specification, a minimum bend radius needs to be maintained at a side load of 0.55 pounds at 135° and at 1.45 pounds at 90°. Such a range in load forces prevents one from optimizing a particular bend limiter for a particular load. Consequently, applicants have found that higher loads tend to buckle the bend limiter at its attachment point to the connector, while lighter loads tend to produce large curvature near the dorsal portion of the strain relief.

Therefore, there is a need for a bend limiter which does not kink the conductor at its tip at light loads or at the base at heavy loads. The present invention fulfills this need among others.

SUMMARY OF INVENTION

The present invention provides a bend limiter which is suitable for handling a relatively wide range of side loading without excessive bending. Specifically, the bend limiter of the present invention is configured to bend at radii, which are less than the critical curvature, for a range of loads. Unlike conventional bend limiters, it resists collapsing at its base at high loads, while remaining compliant at its tip so as not to kink the conductor at lighter loads. To achieve this constant bending radius, the bend limiter comprises a flexible member having two portions. One portion of the limiter has a non-linear profile and is designed to absorb high loads to control bending, particularly at the base of the limiter where conventional limiters tend to collapse. The other portion is at the tip of the limiter and has a tapered linear profile. It is designed to bend, even under light loads, so that conductor leaving the tip does not kink. Applicants have found that this two portion design provides for a constant bending radius even over a relatively wide range of side loads.

Accordingly, one aspect of the invention is a bend limiter which maintains a constant bend radius over a wide range of side loads. In a preferred embodiment, the bend limiter comprises a flexible member having a center bore to accommodate a conductor, a first end suitable for mounting to an end of a connector, and a second end, the flexible member tapering from a relatively large first diameter at the first end to a relatively small diameter at the second end such that the flexible member bends at essentially a constant radius which is no less than the minimum bend radius over a range of side loads having a ratio of no less than 1.5:1.

Another aspect of the invention is a bend limiter which has two portions, one to absorb high loads and prevent kinking at the base, and another to bend under light loads and preventing kinking of the conductor as it leaves the tip of the limiter. In a preferred embodiment, the bend limiter comprises a flexible member having a center bore to accommodate the conductor, a first end suitable for mounting to an end of a connector, and a second end, the flexible member comprises a non-linear portion from the first end to an intermediate point and a linear portion from the intermediate point to the second end.

Yet another aspect of the invention is a terminated cable assembly having the bend limiter of the present invention.

DETAILED DESCRIPTION OF PREFERRED EMBODIMENT

Figure 1A:
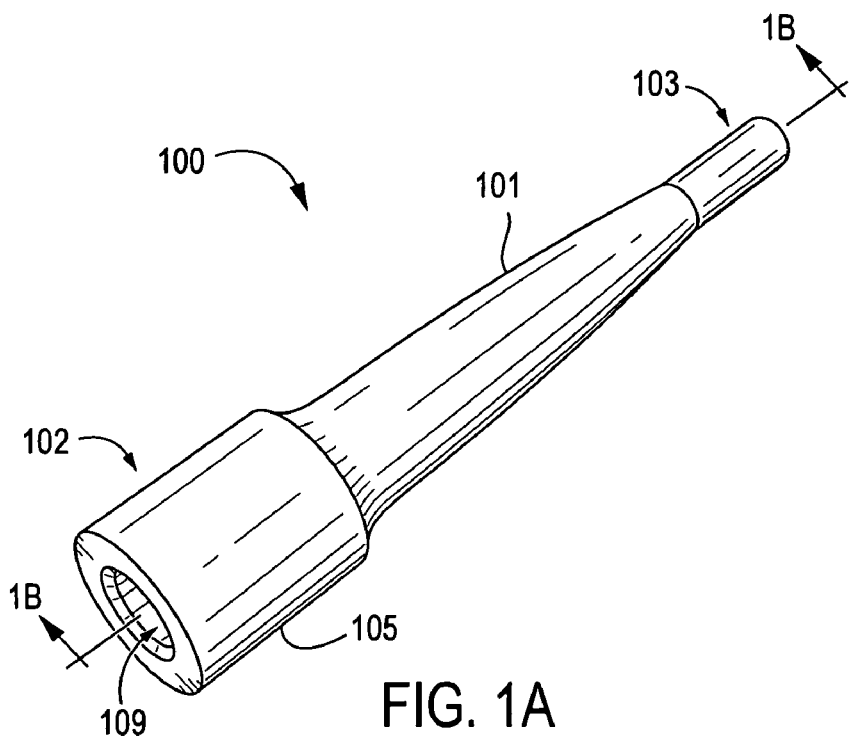
FIGS. 1a and 1b are perspective and cross sectional views of a preferred embodiment of the present invention.
Figure 1B:
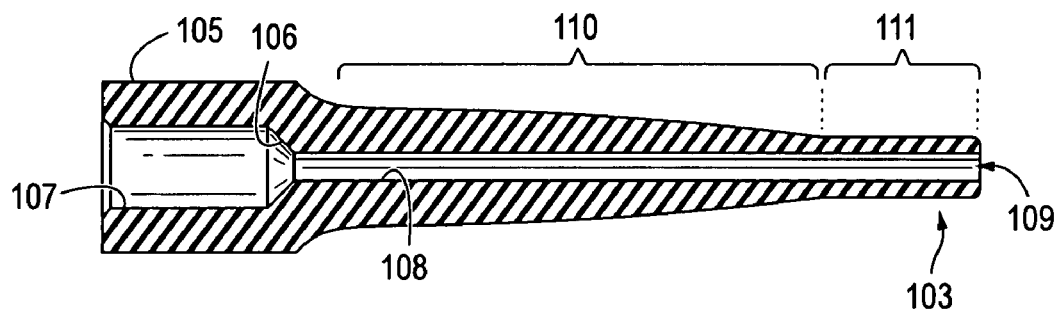

Referring to FIGS. 1a and 1b, a preferred embodiment of the bend limiter 100 of the present invention is shown. The bend limiter 100 is adapted to receive a conductor (not shown) having a minimum bend radius, below which the transmission efficiency suffers significantly as discussed above. The bend limiter 100 comprises a flexible member 101 having a center bore 109 to accommodate the conductor, a first end 102 suitable for mounting to an end of a connector (not shown), and a second end 103. The flexible member 101 is tapered from a relatively large first diameter at the first end 102 to a relatively small diameter at the second end 102 such that the flexible member bends at essentially a constant radius when a variable load is applied to the conductor extending from the second end 103.

As used herein the term "conductor" refers to any conductor for transmitting signals which has a minimum bend radius below which the transmission of the signal is compromised. For example, the conductor may be plastic or glass optical fiber for conducting photonic signals, metal for conducting electrical signals, or an air passage for conducting acoustical signals. For illustrative purposes, the conductor is described herein with respect to an optical fiber.

As used herein the term "connector" refers to any device used to join a segment of the conductor to (1) another conductor segment, (2) an active device such as an electrical and photonic radiation source, detector, or repeater, and (3) a passive device, such as switch, multiplexer, and attenuator. For example, a typical optical fiber connector comprises a housing and a ferrule assembly within the housing. The ferrule assembly comprises a ferrule, which has one or more bore holes to accommodate fibers, and a fiber secured in each bore hole such that the end of the fiber is presented for optical coupling by the ferrule. The housing is designed to engage a "mating structure" having an optical path to which the fiber optically couples during mating. The mating structure may be another connector or an active or passive device as mentioned above. The optical path may be, for example, a fiber in a ferrule, a waveguide in a substrate, a lens, or an optically-transparent mass. The principal function of an optical fiber connector is to hold the fiber end such that the fiber's core is axially aligned with optical pathway of the mating structure. This way, light from the fiber is optically coupled to the optical pathway. Other conventional connector types such as electrical and acoustical connectors are also contemplated in the present invention.

The term "essentially constant" is used with respect to the radius of the bend limiter to indicate that the radius need not be absolutely constant. That is, applicants recognize that, in practice, there will be slight variation in the bend radius of the limiter. Accordingly, as used herein, the term "essentially constant" radius refers to a radius ±10%. In application, the actual radius should not be less than the critical radius of curvature that is defined for a specific wavelength of operation.

Figure 2:
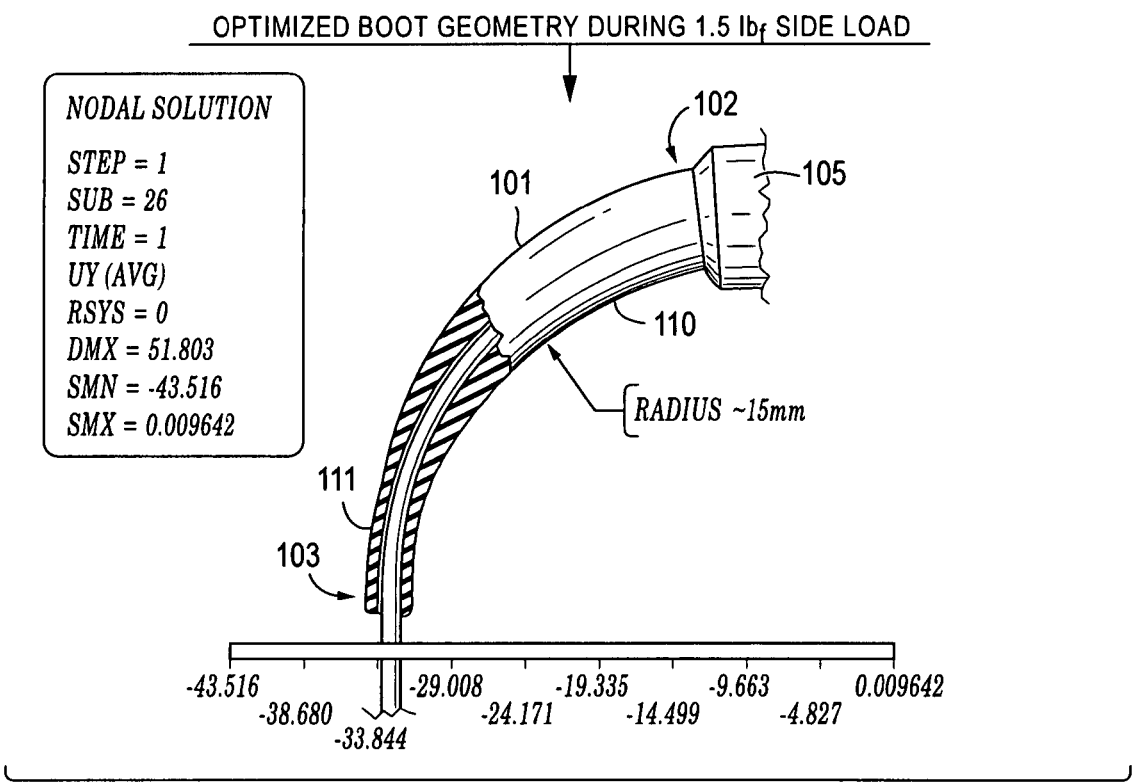
FIG. 2. shows a finite element analysis of the bend limiter of FIG. 1, for a 1.5 lb side load.

The flexible member of the present invention is capable at bending at essentially a constant radius for a relatively wide range of loads. As used herein, the term "load ratio" refers to the ratio between the highest anticipated load and the lowest anticipated load as applied to the conductor exiting the bend limiter in accordance with the Telcordia GR-326, Issue III specification. Referring to FIG. 2, a finite element analysis of the bend limiter 100 of FIG. 1a is shown. This analysis demonstrates the ability of a bend limiter of the present invention to handle different loads while not kinking at the first end 102 or second end 103 and distinguishes it from the prior art. In a preferred embodiment, the bend limiter of the present invention bends at essentially a constant radius for a load ratio of no less than about 1.5:1, more preferably, about 2:1, and, even more preferably, about 3:1.

To effect an essentially constant radius bend, applicants have identified a need for the flexible member to taper according to both a non-linear profile and a linear profile. The non-linear profile or portion 110 of the flexible member is preferably located at the first end 102 while the linear portion 111 is located at the second end 103. The non-linear portion 110 is designed to absorb high loads to control bending, particularly at the base of the limiter where conventional limiters tend to collapse or encounter large curvature due to the maximum bending moment. The linear portion 111 is designed to bend, even under light loads, so that conductor leaving the second end 103 does not kink.

Accordingly, in a preferred embodiment, the profile of the flexible member complies with the following equation:

$$D_o(l_{0-y}) = f_1(l_{0-x}) + f_2(l_{x-y})$$

Wherein l is a point along the length of the flexible member having its origin at the first end;

$l_x$ is a point along the length of the flexible member at which the profile changes from non-linear to linear;

$l_y$ is a point at the second end of the flexible member;

$D_o$ is the outside diameter for a given point l;

$f_1$ is a non-linear function of l; and $f_2$ is a linear function of l.

The non-linear function $f_1(l_{0-x})$ may vary according to the length of the flexible member, the anticipated loads and the material being used. In one preferred embodiment, the non-linear portion employs the ideal elastic model disclosed in U.S. Pat. No. 5,781,681 (hereby incorporated by reference). Specifically, the bend radius of the flexible member is controlled by the shape of the flexible member, and, in particular, the relationship between the outer diameter relative to the inner diameter along the length of the member. The outer and inner diameters ($d_o$ and $d_i$) vary according to a relationship as a function of the side load (F) in pound-force (1bf), the desired bend radius (p) in inches, and the modulus of elasticity (E) of the material from which the flexible member 1 is made, in psi.

The relationship of the radius of curvature ($\rho$) to the bending moment (M), the area moment of inertia (I), and the modulus of elasticity (E) of the subject material from which the cylinder is made, is represented as the equation:

$$\frac{1}{\rho} = \frac{M}{EI}$$

In a preferred embodiment, the shape of the flexible member is generally tubular, and axisymmetric, having associated with it an equation for the area moment of inertia of a hollow cylinder. The equation for the moment of inertia (I) of a hollow cylinder where $d_o$ and $d_i$ are the outer and inner diameters, respectively, of the cylinder may be expressed as follows:

$$I = \frac{\pi}{64} \cdot (d_o^4 - d_i^4)$$

Substituting the equation for the moment of inertia (I) of a hollow cylinder into the equation for the inverse of the radius of curvature ($\rho$), the following relationship results:

$$\rho = \frac{\pi E}{64} \cdot \frac{(d_o^4 - d_i^4)}{M} \text{ or } \frac{1}{\rho} = \frac{64}{\pi E} \cdot \frac{M}{(d_o^4 - d_i^4)}$$

An alternative embodiment of a bend limiter flexible member according to the teachings of the present invention is similarly predictive by substituting the equation for the moment of inertia (I) for an alternative geometric shape such as a tubular member having a polygonal cross section into the equation for the inverse of the radius of curvature (1/$\rho$). In this way, the cross section of the flexible member may be designed for the appropriate radius of curvature ($\rho$). In the preferred case of a hollow cylinder, solving for the outer diameter ($d_o$) results in:

$$d_o = \left(d_i^4 - \frac{64}{\pi E} \cdot \rho \cdot M\right)^{\frac{1}{4}}$$

The bending moment (M) may be represented as a function of the force applied (F) in 1bf, the radius of curvature ($\rho$) in inches, and the angle of the force applied (0) relative to the neutral axis as follows:

$$M(\theta) = F \cdot \rho \cdot (1 - \sin(\theta))$$

Substituting the equation for the bending moment (M) into the equation for the outer diameter ($d_o$) results in a relationship between the outer diameter ($d_o$) in inches of a tubular flexible member as a function of its inner diameter ($d_o$) in inches, the force applied (F) in 1bf, the desired radius of curvature ($\rho$), the angle of the applied load (0) relative to the neutral axis, and the modulus of elasticity (E) in psi for the desired material. The following function results:

$$D_o = \sqrt[4]{\frac{64PR^2}{\pi E}\left(1 - \sin\left(\frac{s}{R}\right)\right) + D_i^4}$$

A companion function determines the distance of flexible member section in inches from the distal end of the connector:

$$l(\theta) = \rho \cdot \theta$$

In a preferred embodiment, the operative parameters include the modulus of elasticity (E) of the particular polymeric material from which the flexible member 1 is molded, the desired minimum radius of curvature ($\rho$), and the applied force (F).

Although the ideal elastic model provides a theoretical basis for achieving a constant radius bend, applicants realize that its use is limited in a couple of respects. First, attempting to create a mold having a profile based on an exponential formula tends to be difficult. Most injection mold manufactures having experience in preparing molds for polymeric bend limiters are not accustomed to exponential functions. Therefore, the costs for such molds tend to be relatively high.

Furthermore, applicants recognize that the theoretical bending of the ideal elastic model is limited by the length of the flexible member. Specifically, as stated in H. J. BARTEN, QUARTERLY OF APPLIED MATHEMATICS, *Large Deflection of Cantilevered Beams*, Vol. III, No. 3 (1945), pp. 272-75 (herein incorporated by reference), once the deflection of the flexible member exceeds about 20% of its length, the bending of the ideal elastic model begins to deviate from linear elasticity in which deflection is directly proportional to load. Since the loads specified in the Telecordia specification will likely deflect the flexible member by more than 20% of its length, the ideal model will be limited in its predictability.

Figure 5:
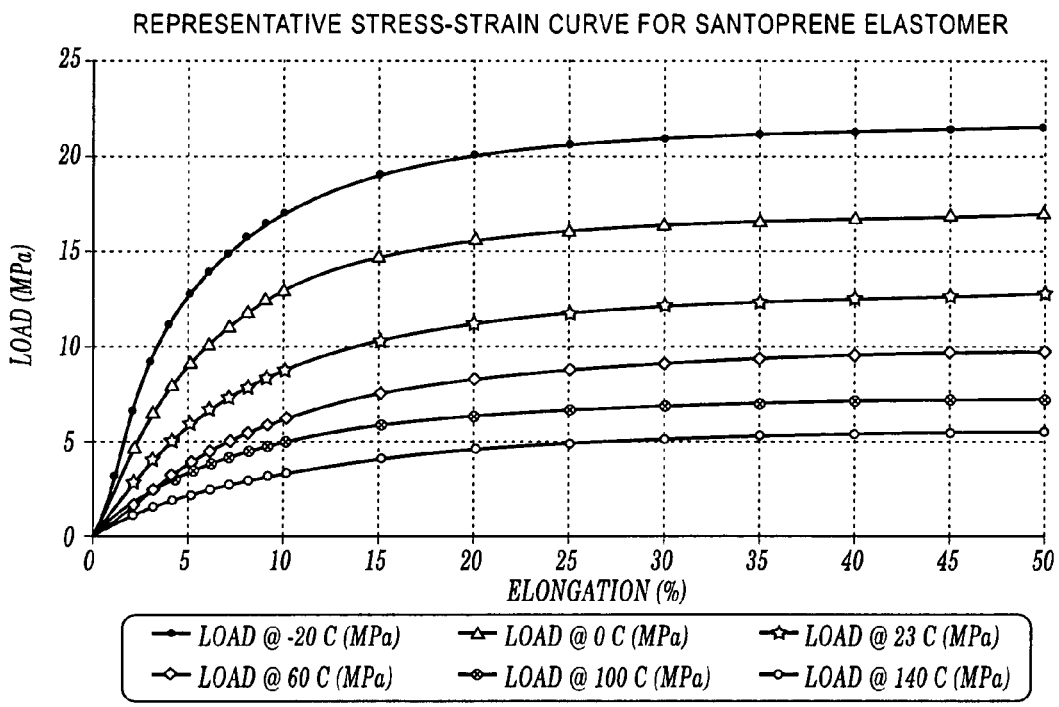
FIG. 5 showing stress-strain behavior for Santoprene elastomer.

Another complication from the ideal model is that polymeric materials traditionally used to injection mold flexible members generally deviate from linear elasticity. This behavior is characterized by the constitutive relation that stress is a nonlinear with respect to strain. As shown in FIG. 5, the tensile stress, while monotonically increasing, follows a convex path with respect to strain. The slope of this curve, or derivative, commonly represents the modulus of the material. Therefore, in the range indicated, the material stiffness decreases as the strain increases. Flexible members often operate at maximum strains of 5 to 10%.

Figure 3:
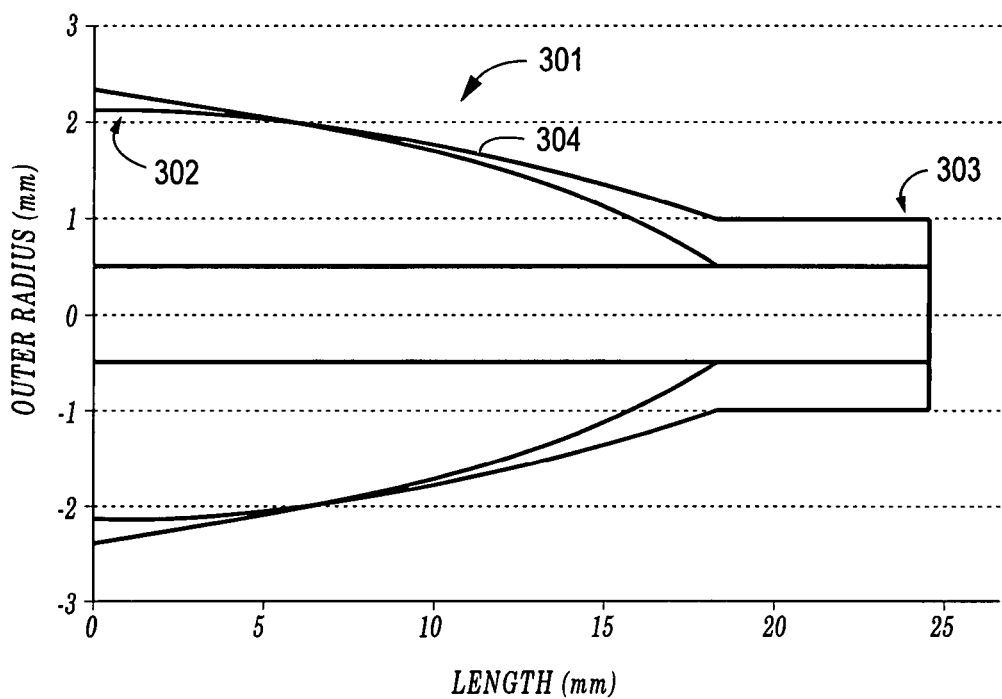
FIG. 3 shows a comparison of the profile of an elastic model versus a modified elastic model.
Figure 4:
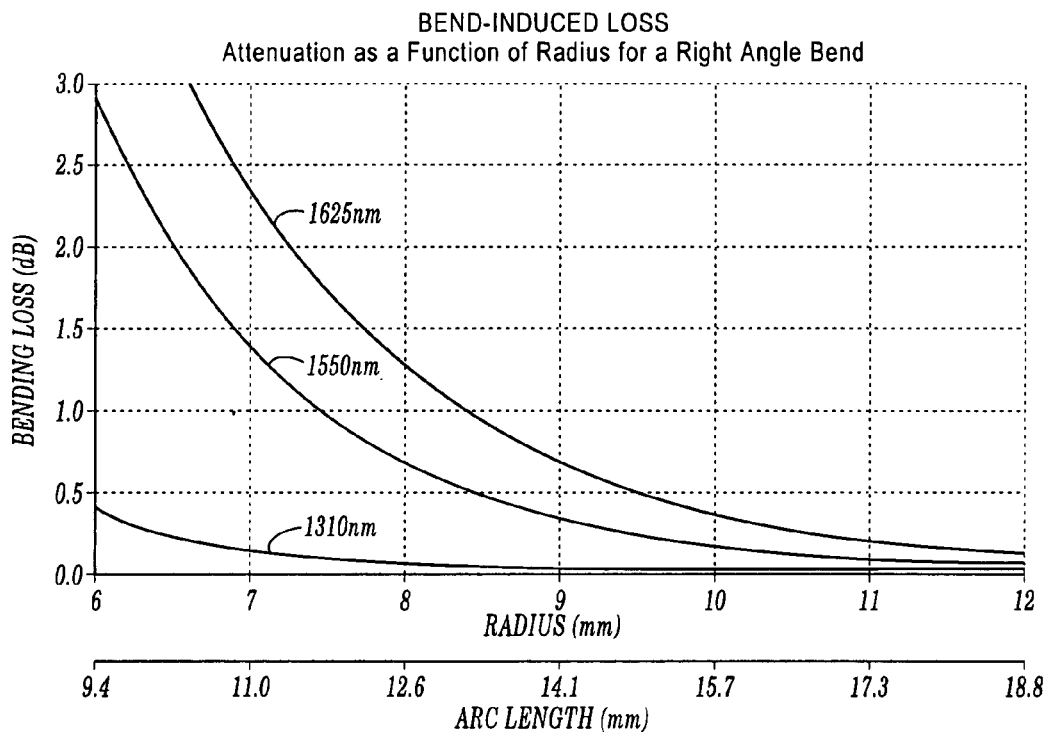
FIG. 4 is a plot showing the attenuation of signal transmission as a function of radius of curvature as well as transmission wavelength.

Therefore, rather than using an ideal elastic model for the non-linear portion, in an alternative preferred embodiment, the present invention uses a modified ideal elastic model. Referring to FIG. 3, the modified elastic model provides for a more slender flexible member 301 toward the first end 302 and slightly thinker member toward the second end 303 in the nonlinear portion 304 of the member. Such a configuration has been found suitable for handling high loads without excessive bending at the base, and light loads without excessive bending at the tip. (See, e.g., the finite element analysis of FIG. 2.)

In a preferred embodiment, the non-linear portion of the flexible member is a constant radius curve as set forth below:

$$f_1(l) = \frac{1}{2} \cdot k + \sqrt{r^2 - (l-h)^2}$$

where r is the radius of curvature, h is the axial position of the radius center, and k is a transverse coordinate of the radius center.

A non-linear portion having this profile has been found to display adequate deflection at light loads, but does not overly deflect (i.e., buckle at low loads).

Linear Portion

The linear portion functions to bend even at light loads and therefore bend along with the conductor to prevent the conducts kinking at the second end. The linear portion of the flexible member has a radius which varies as a linear function as represented by the equation:

$$f_2(l) = al - b$$

where
i. a is a constant; and
ii. b is $D_o$ for $l_x$ based on $f_1$.

In a preferred embodiment, a is 1 for simplicity. It should be understood, however, that a may be optimized to achieve the desired bend radius in this portion.

The length of the non-linear portion (i.e., $l_0$–$l_x$) relative to the linear portion ($l_x$–$l_y$) depends upon a number of factors including stiffness of the conductor, direction of the conductor load vector, and the anticipated ratio of maximum to minimum load magnitudes. In a preferred embodiment, in which the load range is governed by the Telecordia specification, the ratio of the non-linear to linear portions is about 2:1 to about 5:1. The embodiment shown in FIG. 1 is about 3.5:1.

It should be understood that the formula provided above for describing the profile of the flexible member is intended to be an approximation and that slight deviation from these formulas may be appropriate to facilitate manufacturing or optimize the bend limiter for a particular application. For example, one skilled in the art in light of this disclosure may choose to profile the flexible member with an outer diameter that varies in steps that approximate a continuously varying curve. Likewise, the flexible member may be modified to have a polygonal cross section (e.g., an octagon) rather than a circular cross section.

It should be understood that the length of the bend limiter needs to be calibrated to the expected wavelength of operation. That is, the minimum bend radius tends to increase as the frequency decreases. A bend limiter having a longer length can absorb more force from a side load and therefore maintain a greater minimum bend radius. For example, for a 1550 nm signal, the preferred length is about 16 mm, while for a 1625 nm signal the desired length is about 19 mm.

Material

In a preferred embodiment, the bend limiter comprises a thermoplastic elastomer, such as Santoprene* (*a registered trademark of Advanced Elastomer Systems, LP) having a flexural modulus of 1100 psi.

Installation

In use, the flexible member is applied to a fiber optic cable and connector as is conventionally known in the art. The flexible member 101 is first threaded onto an unterminated cable. The cable is stripped as appropriate and is then terminated to the fiber optic connector. The fiber optic connector may be any known connector including single fiber connectors such as LC, MU, SC, ST and FC or multifiber connectors such as MTRJ, MPO, and MPX. The connector interface 105 of flexible member 101 is slid over the rear end of the connector. Referring to FIG. 1b, the inner diameter of the flexible member 101 tapers at an internal transition 106 from a first inner diameter 107 to a second inner diameter 108. The second inner diameter 108 is approximately equal to and slightly larger than an external diameter of the jacket of the fiber optic cable being terminated. It is desirable for the inner diameter of the flexible member to engage the fiber optic cable over most of its length. Accordingly, the inner diameter is chosen to follow the dimensions of the cable to be terminated. In a preferred embodiment, therefore, it is the external diameter that is chosen to vary over the length of the flexible member 1. Resilient expansion of the first inner diameter 107 of the flexible member 101 results in frictional interference of the flexible member 101 to the rear of the connector. The frictional interference therebetween retains the flexible member 1 to the connector. Preferably, the bend limiter is secured to the rear of the connector with epoxy or other adhesive.

What is claimed is:

1. A bend limiter for a conductor having a minimum bend radius comprising: a solid, homogenous flexible member having a center bore to accommodate said conductor, a first end having a relatively large first diameter and being suitable for mounting to an end of a connector, and an opposite second end having a relatively small second diameter, said flexible member having a non-linear portion extending from said first end to an intermediate point, and a linear portion extending from said intermediate point to said second end.

2. The bend limiter of claim 1, wherein an axial cross section of said flexible member is circular.

3. The bend limiter of claim 1, wherein cross section is a polygonal.

4. The bend limiter of claim 1, further comprising:
   a connector interface connected to said first end, said connector interface adapted to be disposed over a rear portion of a connector.

5. The bend limiter of claim 1, wherein said flexible member bends at essentially a radius which is no less than said minimum bend radius when a variable load having a range ratio of no less than 1:1.5 is applied to said conductor extending from said second end.

6. The bend limiter of claim 1, wherein said non-linear portion has a profile complying with a modified ideal elastic model.

7. The bend limiter of claim 6, wherein said non-linear portion has a profile consistent with the following formula:

$$f_1(l) = \frac{1}{2} \cdot k + \sqrt{r^2 - (l-h)^2}$$

wherein r is the radius of curvature, h is the axial position of the radius center, l is the distance from said first end, and k is a transverse coordinate of the radius center.

8. The bend limiter of claim 7, wherein said non-linear portion is essentially continuous such the entire non-linear portion essentially complies with said formula.

9. The bend limiter of claim 7, wherein said non-linear portion is stepped such that points along the length of said non-linear portion comply with said formula.

10. The bend limiter of claim 7, wherein said linear portion tapers from said intermediate point to said second end.

11. The bend limiter of claim 7, wherein said linear portion has essentially a constant diameter.

12. The bend limiter of claim 1, wherein the length ratio of said non-linear portion to said linear portion is about 1.5:1 to about 4:1.

13. The bend limiter of claim 12, wherein said ratio is no less than about 1:2.

14. The bend limiter of claim 13, wherein said ratio is no less than about 1:2.5.

15. The bend limiter of claim 5, wherein said range is about ¼ to about 7/10 kg.

16. The bend limiter of claim 5, wherein said constant radius is no less than about 12 mm.

* * * * *